Oct. 27, 1953     R. KURZWEIL     2,656,752
TOOL SLIDE ARRANGEMENT
Filed Aug. 25, 1948     3 Sheets—Sheet 1
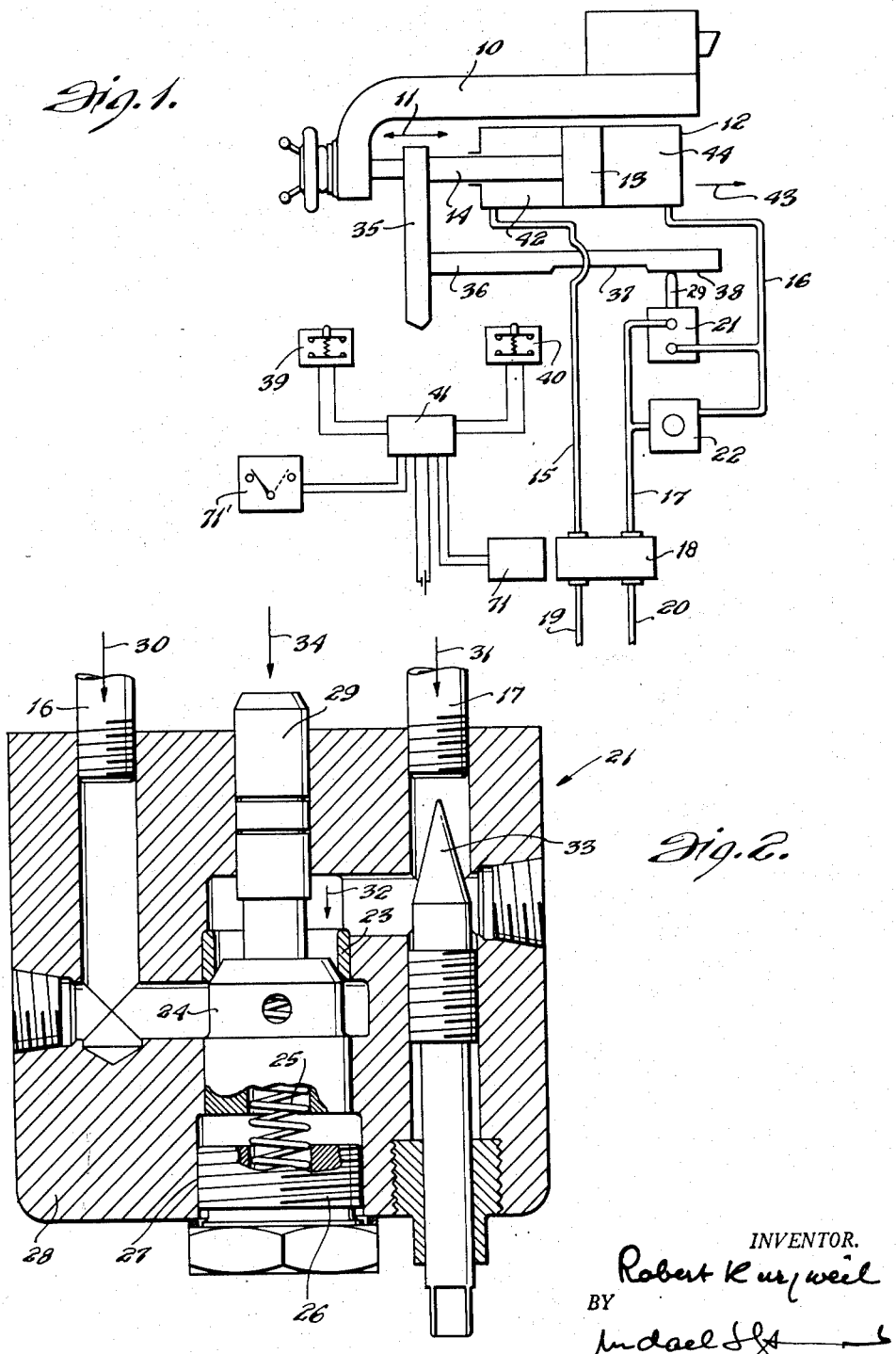
INVENTOR.
Robert Kurzweil
BY

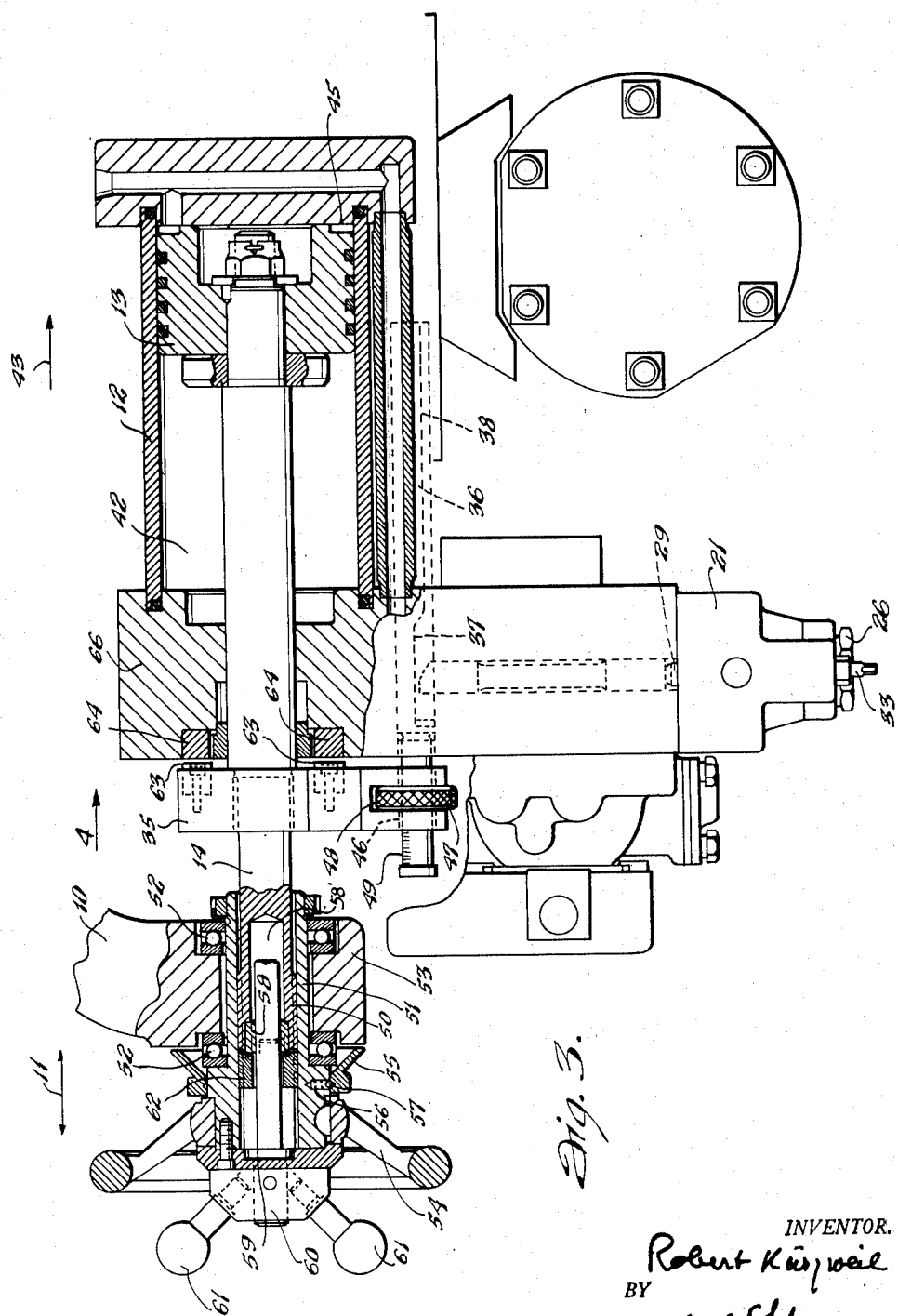

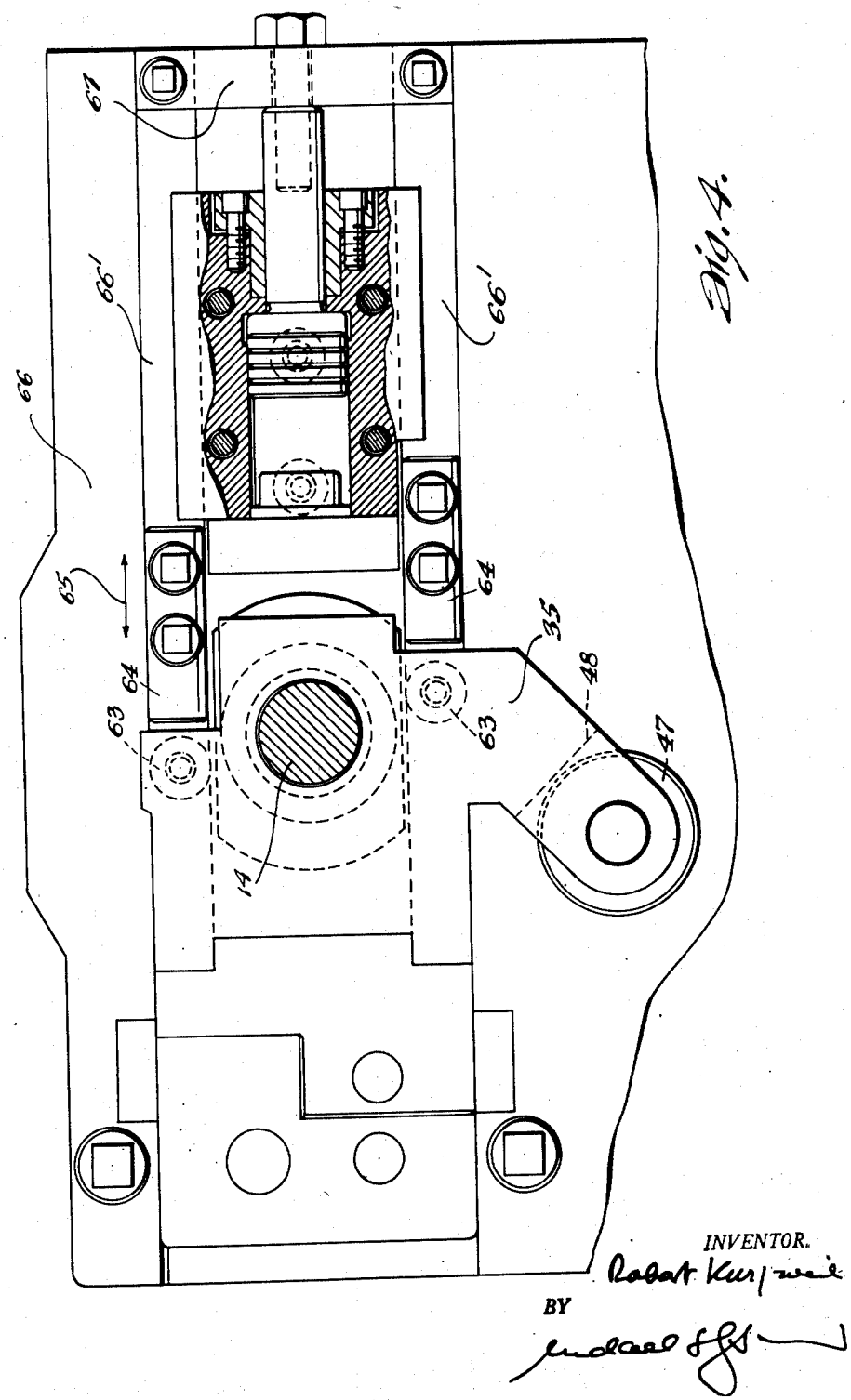

Patented Oct. 27, 1953

2,656,752

UNITED STATES PATENT OFFICE 2,656,752

TOOL SLIDE ARRANGEMENT

Robert Kurzweil, Kew Gardens, N. Y., assignor to Morey Machinery Co. Inc., Astoria, N. Y.

Application August 25, 1948, Serial No. 46,013

1 Claim. (Cl. 82—24)

The present invention relates to lathes and more particularly to tool slides mounted on such lathes and means for operating the same.

It is an object of the present invention to provide hydraulically operated tool slides of an intirely new type.

It is a further object of the present invention to provide a hydraulically operated tool slide in which the stroke of the hydraulic piston is unchanged despite changes of the operative position of the tool held by the tool slide.

It is another object of the present invention to provide novel means to obtain different speeds of advance of the tool slide.

With the above objects in view, the present invention relates to lathes and consists mainly in the combination of a support, a tool slide mounted on the support for reciprocation, a tool holder mounted on the tool slide, hydraulic operating means including a cylinder member and a piston member slidable within the cylinder member, one of members being connected to the support and the other of the members being connected to the tool slide so as to enable reciprocation of the latter by the hydraulic operating means, and means for adjusting the position of the tool slide relative to the member connected thereto in direction of reciprocation of the tool slide, so as to enable variation of the operative position of a tool held by the tool holder without changing the relative position of the piston member and the cylinder member during operation of the same.

In accordance with a preferred embodiment of the present invention, the hydraulic operating means include a hydraulic cylinder mounted on the support, a piston arranged slidably within the hydraulic cylinder, and connecting means connecting the piston with the tool slide so as to enable reciprocation of the latter by the piston during sliding of the same within the hydraulic cylinder, and means for adjusting the connecting means so as to adjust the distance between the piston and the tool slide in direction of reciprocation of the latter, thereby enabling variation of the operative position of the tool held by the tool holder without changing the length of stroke of the piston within the cylinder during sliding of the tool slide into operative position. The abovementioned connecting means preferably include a piston rod, means securing the piston rod at one end to the piston, means connecting the piston rod at its other end to the tool slide slidably in direction of reciprocation of the latter, and means for firmly securing the piston rod to the tool slide in any desired relative position of sliding of the same.

In order to enable a partly fast and partly slow advance of the tool slide and fast return of the same, the lathe is equipped with means for admitting pressure fluid into the abovementioned hydraulic cylinder, actuating means for operating these means for admitting pressure fluid, a first actuating element forming a movable part of the actuating means and adapted to influence the same while moved, a second actuating element mounted on the piston rod in such a manner as to be adapted to engage during sliding of the piston together with the tool slide the first actuating element and to move the same, and adjusting means for moving the second actuating element relative to the piston rod on which it is mounted in direction of the stroke of the piston and to hold it in any desired position.

In order to enable operation of the tool in two operative positions, the lathe is provided with first stop means mounted on the piston rod, second stop means mounted on the support in the path of movement of the first stop means, and means for adjusting the position of at least one of the stop means so as to regulate the moment of engagement of the stop means and to thereby adjust the length of the stroke of the piston within the cylinder.

The novel features which I consider as characteristic for my invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a diagrammatic showing of the operating means for the tool slide;

Fig. 2 is a section through the combination shut-off and check valve diagrammatically shown in Fig. 1;

Fig. 3 is a longitudinal section through a part of the tool slide and its operating means diagrammatically shown in Fig. 1, along line 3—3 of Fig. 4; and Fig. 4 is a front view seen in direction of arrow 4 of Fig. 3 and partial section of some of the operating means of the tool slide.

The tool slide shown in the drawings is operated by hydraulic, electrical and mechanical controls. As clearly shown in Fig. 1, hydraulic power for moving the tool slide 10 in direction of arrow 11 is applied by means of the hydraulic cylinder 12 and piston 13 which is connected by means of piston rod 14 to the tool slide.

The controlling means for admitting pressure fluid to the cylinder 12 are constructed and arranged so as to enable fast advance of the tool slide up to an adjustable point where the movement automatically changes into slow feed. After the tool has moved into its extreme operative position, i. e. after termination of the operative cycle of the tool movement, the hydraulic means automatically return the slide in fast return to its initial starting position.

In order to attain such operation of the tool slide 10, the cylinder 12 is connected by the conduits 15, on the one hand, and the conduits 16, 17, on the other hand, with a four way valve 18 of conventional construction. This four way valve, in turn, is provided with a pressure line 19 for admitting fluid under pressure and with a tank return line 20 for return of the pressure fluid into the tank.

In accordance with the present invention, two additional valves, namely the combination shut-off and check valve 21, and the flow control valve 22 are included in parallel between the fluid conduits 16 and 17.

The flow control valve 22 is a normal valve with a manually adjustable fluid passage so as to enable control of the amount of fluid passing therethrough. An adjustable valve member projects into the conduit passing through the valve body and restricts the cross section of the conduit. By adjusting the position of the valve member the amount of fluid passing through the valve conduit may be adjusted, and for each position of the valve member the amount of fluid adapted to pass through this valve is constant and the same in both directions.

The combination shut-off and check valve 21 is shown in section in Fig. 2 and includes the valve seat 23 on which the valve spool 24 is seated, pressed against the seat by means of spring 25. The pressure of this spring 25 is adjustable by means of the screw member 26 screwed into a corresponding screw threaded hole 27 in the valve body 28. The valve spool 24 is provided at its upper end with an outwardly projecting operating member 29 which is actuated during movement of the piston 13 in the manner described farther below in detail.

It should be stressed that the above described arrangement is constructed and dimensioned so that—in the absence of any influence upon the outwardly projecting member 29—passage of pressure fluid through the valve in direction of arrow 30 is blocked while, if pressure fluid is admitted through the conduit 17 in direction of arrow 31, this pressure fluid will force the valve spool 24 against action of spring 25 in direction of arrow 32, enabling free passage of pressure fluid from conduit 17 into conduit 16, and from there into the four way valve 18.

In addition to the above described valve member, the combination shut-off and check valve 21 also includes an adjustable needle valve 33, making it possible to restrict the flow of pressure fluid in both directions in order to balance, whenever required, the movement of the tool slide.

In order to operate, i. e. press down the projecting member 29 of the combined shut-off and check valve in direction of arrow 34 whenever required, a bracket 35 is mounted on the piston rod 14, as clearly shown in Figs. 1 and 3. To this bracket 35, a cam member 36 having two cam portions 37 and 38 is attached in such a manner that at least one of these cam portions is adapted to engage and actuate the projecting member 29 of valve 21.

In order to properly operate the four way valve 18, electrical contact means 39 and 40 are provided which are operated by the bracket 35 in the end positions thereof. These contact means are connected in well known manner with an electrical relay control arrangement 41 which, in turn, is connected with the solenoid arrangement 71 combined with the four way valve 18 for operating this valve each time bracket 35 and piston 13 are located in one of their end positions.

The above described arrangement operates as follows:

Assumed that at the beginning of operation the tool slide 10 is in its inoperative retracted end position; in this event, piston 13 is located at the left hand end of cylinder 12. In this position, the selector switch 71′ is operated and causes operation of the relay control arrangement 41; this, in turn, causes the solenoid arrangement 71 combined with the four way valve 18 to move the same into a position in which the pressure line 19 is connected with conduit 15, admitting pressure fluid into the left hand compartment 42 of cylinder 12, and in which the tank return line is connected with conduit 17.

At the same time, the cam portion 38 forces the projecting member 29 of valve 21 downward in direction of arrow 34, keeping the valve spool 24 spaced from its seat 23 and enabling free flow of fluid through this valve. Consequently, the fluid contained in compartment 44 of cylinder 12 will be able to escape freely, enabling fast movement of the piston 13 and corresponding fast advance of the tool slide 10.

During such fast advance, the cam 36 will move together with the piston in direction of arrow 43 until the recessed cam portion 37 reaches the projecting member 29 which enables the same together with valve 24 to be moved by spring 25 against direction of arrow 34 into a position in which valve spool 24 is seated on valve seat 23, preventing flow of fluid through this valve from compartment 44 into the four way valve 18.

From this moment on, fluid is able to pass from compartment 44 into the four way valve 18 and from there to the tank through the return line 20 only by means of the flow control valve 22 which is adjusted in such a manner as to permit only slow passage of fluid. Consequently, from this moment on until the piston 13 reaches during sliding in direction of arrow 43 its right hand end position, the resistance of fluid contained in compartment 44 is considerable and the piston will be able to slide only slowly, causing a slow advance period of the tool slide 10.

The moment the piston 13 reaches its right hand end position, the cam stop on the lower end of bracket 35 operates the contact means 40 which, in turn, actuates the relay control arrangement 41 and solenoid arrangement 71 so as to connect conduit 17 of the four way valve 18 with the pressure line 19 and conduit 15 with the tank return line 20.

As explained above, pressure fluid can freely pass through valve 21 in direction of arrow 31; consequently, as there is no obstruction in the conduit 15, the pressure fluid will freely pass through conduit 17, valve 21, and conduit 16 into compartment 44 and will be able to move the piston 13 freely at a fast speed during return of the same against direction of arrow 43, until the piston reaches its left hand end position in which the tool slide is in its initial inoperative position. In this position, the cam stop on the lower end of bracket 35 operates the contact means 39 which will result in automatic turning of the selector switch 71' into inoperative position and stoppage of movement of the tool slide until the selector switch 71' is again operated as set forth above.

At some moment during return of the piston 13, the cam portion 33 will depress the projecting member 29; however, this will not influence the flow of fluid through valve 21 since it will only result in complete opening of this valve.

In order to enable variation of the relative lengths of the fast and slow advance periods, i. e. variation of the point when the fast advance changes into slow advance, the cam 36 is not firmly secured to bracket 35 but passes through a hole 46 in the bracket and is provided with an adjusting nut 47 arranged in slot 48 of the bracket. A graduated scale 49 provided on the outer end portion of the cam 36 indicates the length of slow advance, i. e. feed stroke.

It has been found of advantage to enable the piston 13 to travel during each stroke up to the right hand end wall 45 of the cylinder 12 despite the necessity of different operative positions of the tool slide at the end of each such stroke. In order to enable this, piston rod 14 is not firmly secured to the tool slide 10, but the relative position between the tool slide and the piston rod is adjustable by means of a threaded end portion 50 of the piston rod 14, which is screwed into the screw threaded nut 51 mounted between the thrust bearings 52 on an extension 53 of the tool slide 10, as clearly shown in Fig. 3. This screw threaded nut 51 can be rotated by means of a hand wheel 54, thereby moving the tool slide 10 in axial direction relative to the non-turnable piston rod 14 and piston 13, and thus adjusting the relative position of the tool slide and the piston.

An adjustable micrometer dial 55 is mounted on the nut 51 and held in place by friction applied by means of spring 56 and ball 57. After adjustment has been made, the nut 51 is locked in place by means of the lock nut 58 which is provided on its outer cylindrical face with a screw threading engaging a corresponding screw threading in the hole 58 provided in piston rod 14. This nut 58 is furthermore provided with a rectangular hole engaging the square stud 59 and is moved in axial direction by this square stud 59 which can be rotated through means of hub 60 and two levers 61. The lock nut 58 is held loosely between an annular portion of the end face of the piston rod 14 and nut 62 while the adjustment is made. This nut 62 has a hole which is larger than the diameter of stud 59 so as not to engage the same; however, nut 62 is provided with an outer screw threading engaging the screw threading with nut 51. This arrangement makes it possible that the lock nut 58 does not have to be moved separately but is always ready to be locked in any relative position of nut 51 and piston rod 14.

The locking of the piston rod 14 after adjustment is carried out in the following way:

The nut 62 is screwed in advance into screw threaded nut 51 so that it is spaced a certain distance from the end of the piston rod 14 out of contact with such piston rod, and also out of contact with the lock nut 58.

Then, the position of the two slides is adjusted by turning of the hand wheel 54. Such turning results in turning of nut 51 and sliding of such nut in axial direction relative to the piston rod 14.

When nut 51 is in proper position as determined by the micrometer dial 55, the two levers 61 are turned. Such turning results in turning of the square stud 59 relative to the nut 51.

As the lock nut 58 engages the square stud 59 and also engages the screw threading within the hole 58' in piston rod 14, the lock nut 58 is forced to slide during turning of the square stud 59 by the levers 61 in axial direction of the square stud and of the nut 51 until it presses with its face against the nut 62, preventing turning of such nut 62 relative to the lock nut 58 and piston rod 14. This results in firm locking of the nut 51 to piston rod 14.

If it is desired to readjust the tool slide relative to the piston rod 14, the levers 61 are turned in opposite direction, moving the lock nut 58 away from nut 62, and permitting adjustment to be carried out as described above.

In some events it is advisable to stop the tool slide 10 together with the piston 13 before they reach their final operating position, for instance, if it is necessary to remove the material in two cuts.

A device adapted for the above purposes includes stop buttons 63 mounted on the bracket 35 and corresponding stop members 64 slidably mounted in direction of arrow 65 on the supporting member 66 which supports also the tool slide 10 and the hydraulic cylinder 12, as clearly shown in Fig. 4.

These stop members 64 are connected with each other by means of the longitudinal supporting members 66' and the cross member 67 and can be moved into or out of the path of the stop buttons 63: When they are moved into the path of the stop buttons, the tool slide will be stopped before reaching its final position, while, when they are moved out of the path of the stop buttons, the tool slide will be able to move freely into its operative end position.

It will be understood that each of the elements described above, or two or more together, may also find a useful application in other types of metal working machines, differing from the types described above.

While I have illustrated and described the invention as embodied in lathes, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claim.

What I claim as new and desire to secure by Letters Patent is:

In a lathe including a tool slide, in combination, fluid operating means including a reciprocable piston; a piston rod secured at one end thereof to said piston, said piston rod having an outer thread on the other end thereof; a sleeve member having an inner thread engaging said outer thread on said piston rod, said sleeve member being secured to the tool slide; manually operated means secured to said sleeve member for rotating the same whereby said piston rod is screwed in axial direction to a position adjusted relatively to the tool slide; manually operated locking means located in said sleeve member for locking said piston rod in an adjusted position; means supplying pressure fluid to said fluid operating means; actuating means operating said means for supplying pressure; a bracket member secured to said piston rod and extending transversely thereto, said bracket member being formed with a bore extending parallel to the axis of said piston rod; a cam member having a threaded end portion, and passing with said threaded end portion through said bore in said bracket member; a manually operated nut on said threaded end portion of said cam member, said nut engaging said bracket member, and being prevented by the same to move in axial direction of said threaded end portion so that by rotation of said nut the position of said threaded end portion and of said cam member is adjusted relatively to said bracket member and to said piston rod; a fixed support slidingly supporting said piston rod intermediate said piston member and said bracket member; stop means mounted on said support slidably in a direction transversal to the direction of reciprocation of said piston rod between an operative and an inoperative position, and engaging in operative position thereof said bracket member so as to interrupt reciprocating movement of said piston member; and operating means on said fixed support engaging said stop means for movement between inoperative and operative position.

ROBERT KURZWEIL.

References Cited in the file of this patent

UNITED STATES PATENTS

| Number | Name | Date |
|---|---|---|
| 789,566 | Riddell | May 9, 1905 |
| 1,812,533 | Hunt | June 30, 1931 |
| 1,912,184 | Ferris et al. | May 30, 1933 |
| 1,928,373 | Flatter | Sept. 26, 1933 |
| 1,950,039 | Smith | Mar. 6, 1934 |
| 1,986,862 | Svenson | Jan. 8, 1935 |
| 2,063,414 | Tweddell | Dec. 8, 1936 |
| 2,209,608 | Nye et al. | July 30, 1940 |
| 2,285,069 | Vickers | June 2, 1942 |
| 2,335,809 | Stacy | Nov. 30, 1943 |
| 2,374,774 | Olsen | May 1, 1945 |
| 2,392,074 | Wasson | Jan. 1, 1946 |
| 2,460,477 | Wallman | Feb. 1, 1949 |